United States Patent
Scaggs

(10) Patent No.: US 7,898,710 B1
(45) Date of Patent: Mar. 1, 2011

(54) HIGH PRECISION THIN FILM SCRIBING DEVICE

(75) Inventor: Michael J. Scaggs, Weston, FL (US)

(73) Assignee: Vinyl Technologies, Inc., Fitchburg, MA (US)

( * ) Notice: Subject to any disclaimer, the term of this patent is extended or adjusted under 35 U.S.C. 154(b) by 0 days.

(21) Appl. No.: 12/623,938

(22) Filed: Nov. 23, 2009

(51) Int. Cl.
*G02B 26/08* (2006.01)
(52) U.S. Cl. .................. 359/206.1; 359/210.1; 359/210.2
(58) Field of Classification Search ............... 359/206.1, 359/210.1–210.2
See application file for complete search history.

(56) References Cited

U.S. PATENT DOCUMENTS

| | | | |
|---|---|---|---|
| 1,735,108 A | 11/1929 | Cox | |
| 4,436,260 A | 3/1984 | Donelan | |
| 5,387,999 A | 2/1995 | Hayashi | |
| 6,320,705 B1 | 11/2001 | Dube | |
| 6,836,364 B2 | 12/2004 | Dube et al. | |
| 7,196,831 B2 | 3/2007 | Broome et al. | |

*Primary Examiner* — James Phan
(74) *Attorney, Agent, or Firm* — Ronald E. Smith; Smith & Hopen, P.A.

(57) ABSTRACT

A high precision refractive scanner includes a light source that generates a light beam, a lens pair including a stationary plano-concave lens and a movable plano-convex lens, a thin film-covered panel, and an F-theta lens that focuses the light beam that passes through the lens pair onto the panel. The plano-convex lens has an initial position where a first edge is in refracting relation to the light beam and a final position where a second edge is in refracting relation to the light beam. The plano-convex lens rotates about a pivot point that represents the origin of the respective radii of curvatures of both lenses with a nominal air gap between the two lenses. Rotation of the plano-convex lens causes the light beam to be refracted over a predetermined scan angle. A focal spot forms a scribe when it travels from a first to a second edge of the panel.

9 Claims, 3 Drawing Sheets

HIGH PRECISION THIN FILM SCRIBING DEVICE

BACKGROUND OF THE INVENTION

1. Field of the Invention

This invention relates, generally, to laser machining. More particularly, it relates to precise removal of thin films in photovoltaic cells.

2. Description of the Prior Art

Galvanometric scanning mirrors and polygon mirrors are well-known.

Conventional methods of removing thin films from photovoltaic cells employ galvanometer based scan mirrors in combination with a scan lens, typically an F-theta lens. Galvanometer scanning mirrors are limited in precision due to the dither of the galvanometer motors. These motors have typical accuracies of less than twenty microradians (20 μrad). A solar panel can be more than five hundred millimeters (500 mm) wide, corresponding to twenty microns (micrometers) (20 μm) for a scan lens having a one thousand millimeter (1000 mm) focal length. The scribe widths in thin film solar cells are less than one hundred microns (100 μm), so it is desirable to have the accuracy of the scribe be less than five percent (5%) of the scribe width. This is not possible with conventional technologies for thin film scribing of large areas.

U.S. Pat. No. 1,735,108 (1929) discloses a combination plano-concave and plano-convex lens pair as an adjustable wedge or prism. U.S. Pat. No. 7,196,831 discloses a counter rotating disk of lenses. The utility of this structure is limited because the lenses add optical power to the system which the design must accommodate. U.S. Pat. No. 5,387,999 discloses a means to control camera shake but has a very limited field of correction and only applies to cameras. U.S. Pat. No. 6,836,364 discloses a rotational means but the fabrication of the optical components is dependent upon selecting glasses with matching densities but with different indices of refraction. This limits the choice of glass and wavelengths to use and may not be suitable for a high power laser scribing application. U.S. Pat. No. 6,320,705 discloses an adjustable wedge that uses a liquid interface for better matching of the optics. A liquid interface cannot be used in high power laser applications and further prohibits high speed scanning. U.S. Pat. No. 4,436,260 discloses an adjustable wedge that uses an air bearing between two optics. The structure lacks utility in high power laser thin film scribing.

SUMMARY OF THE INVENTION

The long-standing but heretofore unfulfilled need for a high precision thin film scribing apparatus is now met by a new, useful, and non-obvious invention.

The inventive structure includes a large area scribing system that employs an all refractive scanning means in combination with an F-theta scan lens to produce precision scribes in large area thin films such as a solar photovoltaic cell. A pair of matched lenses which add no detrimental optical power to the scribing lens is configured so one lens is stationary and the other rotated about a common axis to provide a prismatic effect to the incoming light. That light is then directed though an F-Theta scan lens and onto a thin film to selectively remove the film in the fabrication of a solar panel.

More particularly, in the first embodiment, the novel all refractive scanner includes a plano-concave lens element followed by a plano-convex lens element. The glass material, the size and the radius of curvatures of the lenses are selected to establish a particular scan angle. The respective radii of curvature of both elements are matched to cancel out optical power. The plano-concave lens is held stationary while the plano-convex lens element rotates about the axis of its radius of curvature. This causes any incoming light beam to be refracted as if the light were passing through an adjustable optical wedge. The light is refracted over the predetermined scan angle as the plano-convex lens is rotated. When the optic rotates past a particular point where the light can no longer be transmitted, an "off" signal is sent to a laser beam to turn it off until the optic rotates another one hundred eighty degrees (180°) to start scanning again. The panel with the thin film is advanced during the "off" time. The light that passes through the plano-concave/plano-convex lens pair then proceeds to an F-Theta scan lens that focuses the light onto a thin film panel where a scribe is required.

In the preferred embodiment, the plano-convex lens rotates continuously over three hundred sixty degrees (360°) of rotation. However, in lieu of a rotational mounting, a mechanical linkage having a pivot point about the radius of curvature of the lens is moved up and down to provide back and forth scanning using a high precision linear stage. This approach retains the high accuracy but decreases the overall scan speed due to the acceleration and deceleration of the linear stage.

In a second embodiment, the lens combination is optimized for no optical power and one of the two elements is moved in an X and Y fashion to create a decenter of the optic. This decentering causes an angular deviation of the incoming beam which is then directed through an F-Theta scan lens. The field size of this combination is reduced due to the coma and astigmatism introduced by the decentering. These aberrations can be minimized through proper material selection and curvature correction. Precision scanning at the focus of the F-theta lens can be of sub micron precision if a high precision X-Y stage is used where one stage moves one lens in the X direction and the other stages moves the opposing lens in the other, for example.

The primary object of this invention is to reduce the error of the positioning of a scribe line in the production of thin film solar cells where the scan width can be greater than two hundred fifty millimeters (250 mm) for a five hundred millimeter (500 mm) long focal length scan lens.

Another important object is to provide a galvanometric mirror scanner having the ability to scan at higher speeds than traditional galvanometric mirror scanners.

Yet another object is to provide the same angular scan range of conventional galvanometer systems but with higher positional accuracy and faster speeds.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
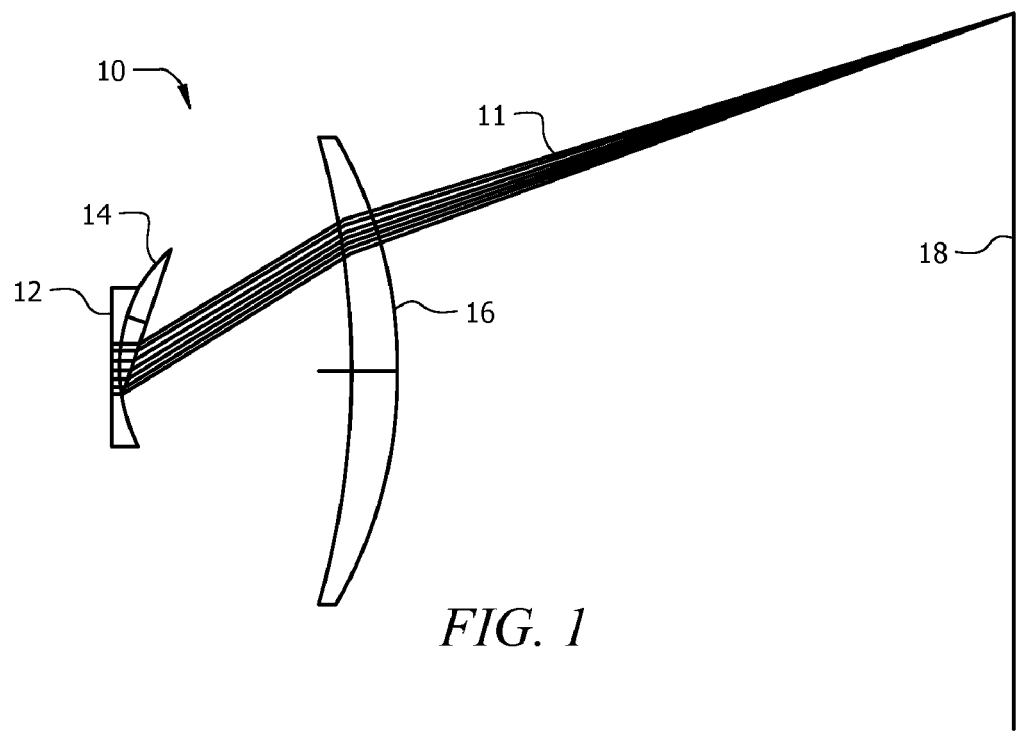
FIG. 1 is a side elevational view of a first embodiment of the novel high precision refractive scanner depicting the plano-convex lens in its initial rotational position.

Referring now to FIG. 1, it will there be seen that a diagrammatic representation of a high precision refractive scanner is denoted as a whole by the reference numeral 10.

First optical element 12 is a plano-concave, high index glass such as ZnS which is usable from the visible to the far infrared. Second optical element 14 is a plano-convex element having a convex surface identical in radius but of opposite sign relative to first optical element 12. Second optical element 14 rotates about a radius of curvature of first optical element 12 as best understood by comparing FIGS. 1 and 2.

The glass material, the size and the respective radii of curvatures of lenses 12 and 14 are selected to establish a particular scan angle and are matched to cancel out optical power.

Third optical element 16 is an F-theta lens and is depicted as a simple, single element to simplify the drawings. However, in practice, said lens 16 would be two, three, or more elements depending upon the aberration reduction needed.

Figure 2:
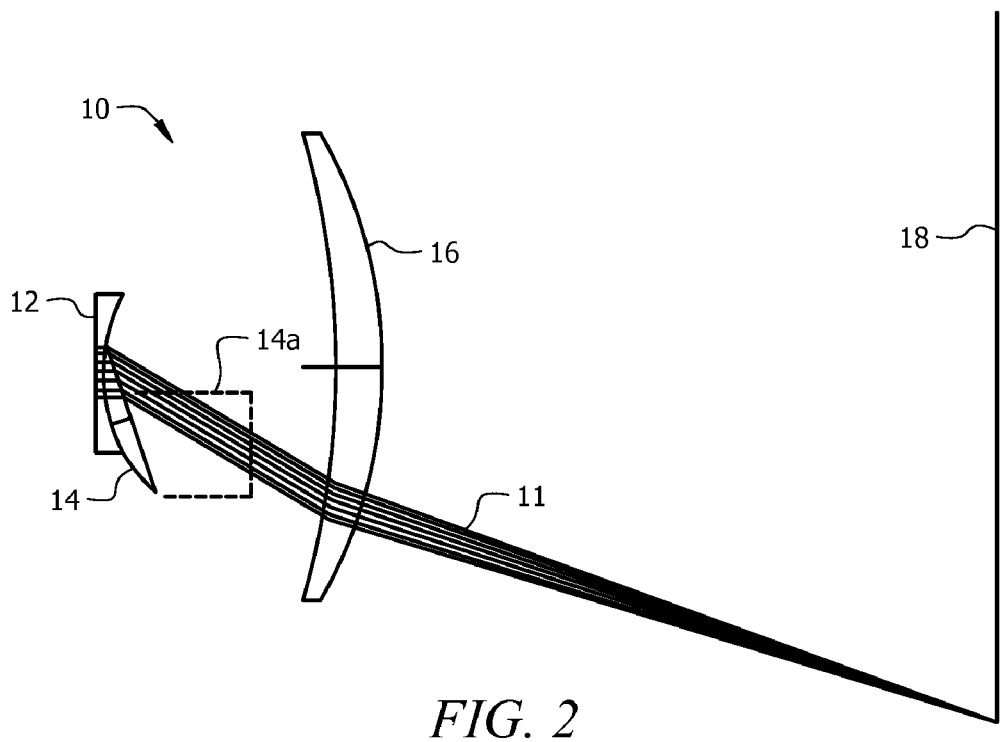
FIG. 2 is a side elevational view of the novel high precision refractive scanner depicting the plano-convex lens in its final rotational position.
Figure 3:
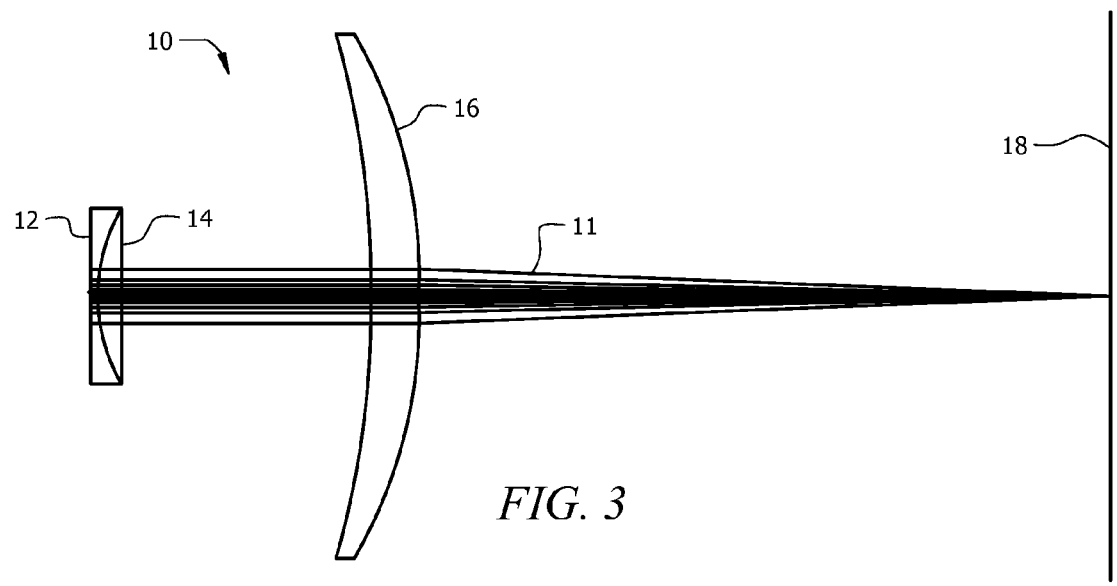
FIG. 3 is a side elevational view of the novel high precision refractive scanner depicting the plano-convex lens in a rotational position that is mid-way between its initial and final positions.

Note in FIG. 1 that the lowermost edge of plano-convex lens 14 is refracting the lowermost edge of a laser beam 11 in an upward direction as drawn and that in FIG. 2 the uppermost edge of said plano-convex lens is refracting the uppermost edge of said laser beam in a downward direction as drawn. Accordingly, the FIG. 1 position of plano-convex lens 14 is its initial position and the FIG. 2 position of said plano-convex lens is its final position. FIG. 3 is therefore understood as depicting said plano-convex lens 14 midway between its initial and final positions. More particularly, FIG. 3 depicts high precision scanner 10 in its neutral position, i.e., with the respective optical axes of first optical element 12, second optical element 14, and third optical element 16 in registration with one another. This is the on-axis configuration of the scanner. When in this configuration, there is no prismatic effect to deviate light beam 11 from the optical axis of said light beam 11.

The light that passes through said three lenses 12, 14, and 16 is focused to a focal spot that lands upon photovoltaic thin film 18. As second element 14 is rotated with respect to first element 12 from the position of FIG. 1 to the position of FIG. 2, i.e., when second element 14 is rotated from a first end of the scan field to the opposite, second end of the scan field, the focused light point travels from the top of photovoltaic thin film 18 as depicted in FIG. 1 to the bottom thereof as depicted in FIG. 2. The focal spot is mid-way between said two extremes in the FIG. 3 configuration.

Figure 4:
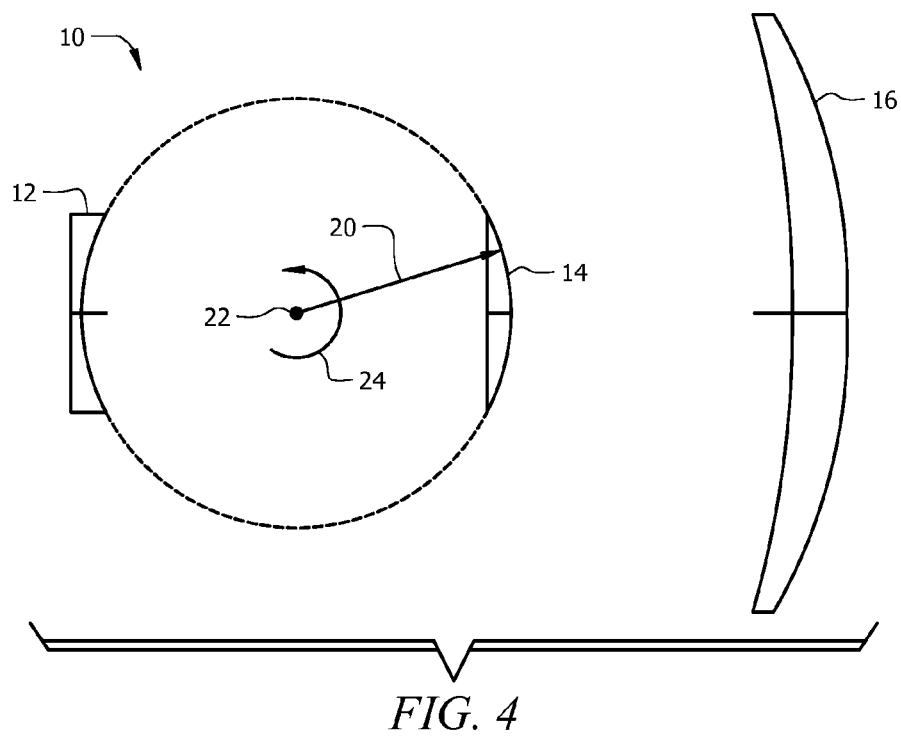
FIG. 4 is a side elevational view of the novel high precision refractive scanner depicting the plano-convex lens in a rotational position where it has rotated one hundred eighty degrees (180°) from its FIG. 3 position.

FIG. 4 depicts high precision scanner 10 when the laser or other light source is in its "off" mode. When second optical element 14 rotates beyond the field of first optical element 12, it must then be returned to its FIG. 1 position. The laser beam is turned off as said second optical element is returned to said FIG. 1 position. In this embodiment, in order to return to said FIG. 1 position, second element 14 rotates out of the clear aperture of first element 12. Lens 14 rotates with a pivotally mounted mechanical linkage represented by arrow 20 in FIG. 4. In the diagram of FIG. 4, the pivot point for link 20 is denoted 22; it is positioned about half way between said first and second lenses 12 and 14. Second lens 14 follows a circular path of travel in a counterclockwise direction from FIG. 1 to FIG. 2 to FIG. 3 and finally back to FIG. 1 as indicated by directional arrow 24. More particularly, pivot point 22 is the origin of the respective radii of curvatures of lenses 12 and 14 with a nominal air gap between said two lenses. The plano-concave and plano-convex lens pair when in its unrotated, neutral position is placed at the entrance pupil of F-theta lens 16 at a location having a distance from the F-theta lens that is greater than twice the respective radii of curvatures.

Instead of using mechanical linkage 20 to rotate plano-convex lens 14 about pivot point 22 in a three hundred sixty degree (360°) rotation, a high precision linear stage may be used to accomplish the return to the FIG. 1 initial position of the two lenses after the light can no longer be transmitted due to the disengagement of said two lens from one another. A pivot point is established about the radius of curvature of the lens and plano-convex lens 14 is moved up and down to provide back and forth scanning. This alternative approach is not depicted in detail but the path of travel of the bottom edge of plano-convex lens 14 is suggested in FIG. 2 by dotted lines denoted 14a. This non-rotational displacement of plano-convex lens to its FIG. 1 position retains the high accuracy of the rotational embodiment but decreases the overall scan speed due to the acceleration and deceleration of the linear stage.

Figure 5:
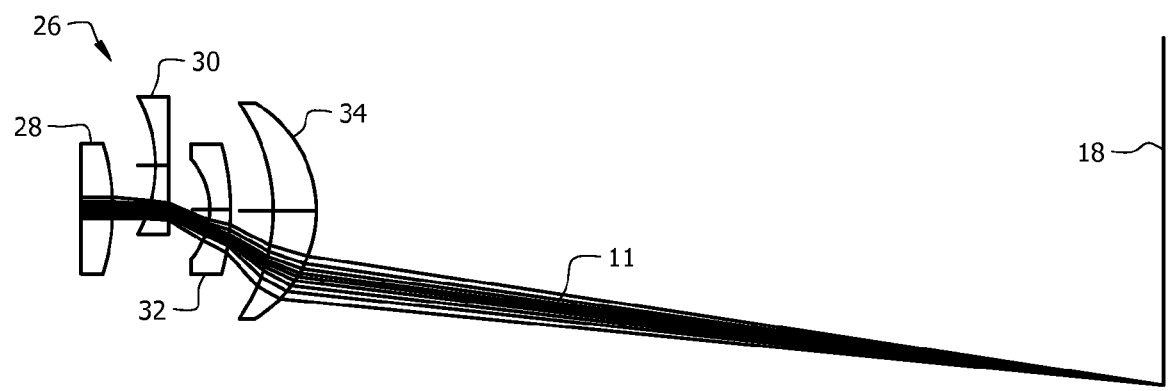
FIG. 5 is a side elevational view of a second embodiment of the invention.

FIG. 5 depicts a second embodiment, denoted 26 as a whole. First lens element 28 is a fixed, plano-convex lens. Second element 30 is a plano-concave lens that can be moved linearly about an X and Y axis. The Z axis is the optical axis. The respective curvatures of first and second elements 28, 30 are chosen so that they add no optical power to the beam. The beam moves as depicted when second element 30 is de-centered as depicted. Lens 32 and lens 34 form a two (2) lens F-theta lens where the curvatures are ground for minimum aberration of the focal spot.

Plano-concave lens 30 is moved by a high-precision X-Y stage. Such an X-Y stage, for example, may have a movement of plus or minus ten millimeters (+/−10 mm) with a repeatability of less than one hundred nanometers (100 nm). The scan field may be as large as one hundred fifty millimeters (150 mm). The repeatability of the scan field is the ratio of one hundred nanometers to ten millimeters (100 nm/10 mm) which translates to one and a half microns (1.5μ) over the one hundred fifty millimeters (150 mm) field.

It is therefore understood that the difference between the first and second embodiments is that the second lens rotates with respect to the first in the first embodiment, but is displaced about an X-Y axis in the second embodiment. The effect is the same in both embodiments.

Figure 6:
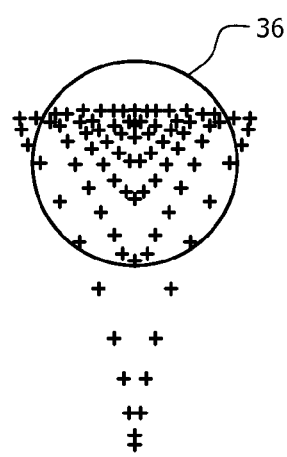
FIG. 6 is a ray trace spot diagram depicting a focal spot created by the refractive scanner of the second embodiment.

FIG. 6 is a ray trace spot diagram depicting the focal spot of the novel refractive scanner of FIG. 5. Circle 36 represents the diffraction limited airy disk. The majority of light falls within the airy disk and therefore indicates the design to be near diffraction limited over the one hundred fifty millimeters (150 mm) scan field.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A high precision refractive scanner, comprising:
   a light source that generates a light beam when activated;
   a stationary plano-concave lens;
   a movably mounted plano-convex lens;
   a thin film-covered panel;
   an F-theta scan lens that focuses said light beam from said light source that passes through the plano-concave lens and the plano-convex lens onto said thin film-covered panel;
   said plano-concave lens and said F-theta scan lens sharing a common optical axis;
   said plano-convex lens having an initial position where a first edge thereof is in refracting relation to said light beam;
   said plano-convex lens having an final position where a second edge, opposite to said first edge, is in refracting relation to said light beam;
   said plano-convex lens having a neutral position where an optical axis of said plano-convex lens is coincident with said common optical axis;
   said plano-convex lens element mounted for rotation about a pivot point that is the origin of the respective radii of curvatures of said plano-concave and plano-convex lenses with a nominal air gap between said two lenses, said plano-concave and plano-convex lenses when in an unrotated, neutral position being placed at an entrance pupil of said F-theta lens at a location having a distance from said F-theta lens that is greater than twice said respective radii of curvatures;
   said rotation of said plano-convex lens causing said light beam from said light source to be refracted as if the light were passing through an adjustable optical wedge, said light being refracted over a predetermined scan angle as said plano-convex lens is rotated;
   said light beam passing in sequence through said plano-concave lens element, said plano-convex lens element, and said F-theta scanning lens and forming a focal spot on said thin film-covered panel to thereby form a scribe when said focal spot travels from a first edge of said thin film-covered panel to a second edge of said thin film-covered panel.

2. The high precision refractive scanner of claim 1, further comprising:
   said plano-concave lens element and said plano-convex element having respective radii of curvatures that are matched to cancel out optical power.

3. The high precision refractive scanner of claim 2, further comprising:
   control means for turning said light source off when said plano-convex lens is not in said initial position, said final position, or any position therebetween;
   control means for turning said light source on when said plano-convex lens is in said initial position, said final position, or any position therebetween.

4. The high precision refractive scanner of claim 3, further comprising:
   control means for advancing said thin film-covered panel when said light source is turned off so that a new scribe is made in said thin film-covered panel when scanning resumes.

5. A high precision refractive scanner, comprising:
   a light source that generates a light beam when activated;
   a stationary plano-concave lens;
   a movably mounted plano-convex lens;
   a thin film-covered panel;
   at least one F-theta scan lens that focuses said light beam from said light source that passes through the plano-concave lens and the plano-convex lens onto said thin film-covered panel;
   said plano-concave lens and said at least one F-theta scan lens sharing a common optical axis;
   said plano-convex lens having an initial position where a first edge thereof is in refracting relation to said light beam;
   said plano-convex lens having an final position where a second edge, opposite to said first edge, is in refracting relation to said light beam;
   said plano-convex lens having a neutral position where an optical axis of said plano-convex lens is coincident with said common optical axis;
   a high precision linear stage to which said plano-convex lens element is mounted for X-Y movement relative to said common optical axis;
   said movement of said plano-convex lens causing said light beam from said light source to be refracted as if the light beam were passing through an adjustable optical wedge, said light beam being refracted over a predetermined scan angle as said plano-convex lens is moved;
   said light beam passing in sequence through said plano-concave lens element, said plano-convex lens element, and said at least one F-theta scanning lens and forming a focal spot on said thin film-covered panel to thereby form a scribe when said focal spot travels from a first edge of said thin film-covered panel to a second edge of said thin film-covered panel.

6. The high precision refractive scanner of claim 5, further comprising:
   said plano-concave lens element and said plano-convex element having respective radii of curvatures that are matched to cancel out optical power.

7. The high precision refractive scanner of claim 5, further comprising:
   control means for turning said light source off when said plano-convex lens is not disposed in refracting relation to said light beam;
   control means for turning said light source on when said plano-convex lens is in refracting relation to said light beam.

8. The high precision refractive scanner of claim 7, further comprising:
   control means for advancing said thin film-covered panel when said light source is turned off so that a new scribe is made in said thin film-covered panel when scanning resumes.

9. A high precision refractive scanner, comprising:
   a light source that generates a light beam when activated;
   a stationary plano-convex lens;
   a movably mounted plano-concave lens adapted to be moved linearly about an X and Y axis;
   said plano-concave lens adapted to be moved by a high-precision X-Y stage;
   said plano-convex lens and said plano-concave lens preselected to add no optical power to said light beam;
   a two lens F-theta lens where respective curvatures thereof are ground for minimum aberration of a focal spot.

* * * * *